No. 710,532. Patented Oct. 7, 1902.
C. SPRAGUE.
RAIL BOND.
(Application filed Feb. 24, 1902.)
(No Model.)

Witnesses:
H. B. Davis.
M. E. Bell.

Inventor:
Charles Sprague.
by B. J. Noyes
Atty

UNITED STATES PATENT OFFICE.

CHARLES SPRAGUE, OF BOSTON, MASSACHUSETTS.

RAIL-BOND.

SPECIFICATION forming part of Letters Patent No. 710,532, dated October 7, 1902.

Application filed February 24, 1902. Serial No. 95,242. (No model.)

*To all whom it may concern:*

Be it known that I, CHARLES SPRAGUE, of Boston, county of Suffolk, State of Massachusetts, have invented an Improvement in Rail-Bonds, of which the following description, in connection with the accompanying drawings, is a specification, like characters on the drawings representing like parts.

This invention has for its object to improve the construction of rail-bonds of that type comprising, essentially, a laminated strip, to the end that the extremities of the strip may be very securely held together and a good electrical connection obtained, notwithstanding the bond may be of a faulty construction.

In accordance with this invention the laminated strip is composed of a plurality of like superimposed plates or strips of copper or other material formed to present a pair of flat feet and an intermediate extensible portion, said plates or strips being made separate or independent of each other and soldered together. The free ends of the plates composing the flat feet are soldered together by dipping said ends in melted solder and then holding them firmly pressed together while the solder hardens. This method of soldering the ends leaves a film of solder between each layer. The soldered ends are then inclosed in a sheath or clip which covers and conceals the free ends of the several layers of the laminated strip. The sheath will be composed of a short strip of copper bent or folded to present a bottom layer and a top layer, and an end portion and preferably will also comprise a pair of upturned side portions. The sheath is placed upon and soldered to each flat foot of the bond. In addition to securing said sheath by solder a rivet may be passed through each flat foot and through the sheath. To complete the bond, a thick strip of sheet-solder is attached at one end to the bottom of each flat foot.

Figure 1:
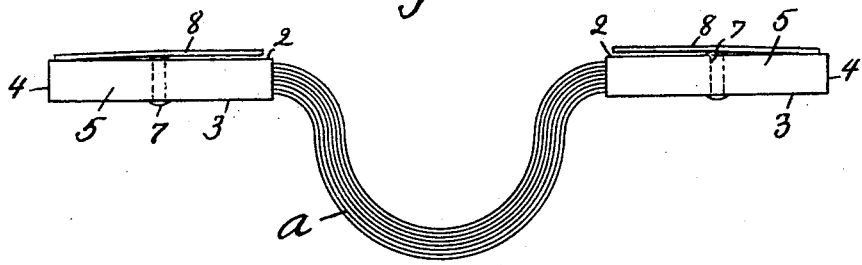
Figures 2, 3:
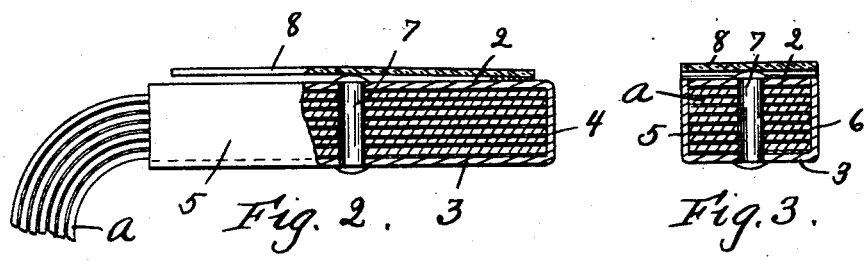
Figure 4:
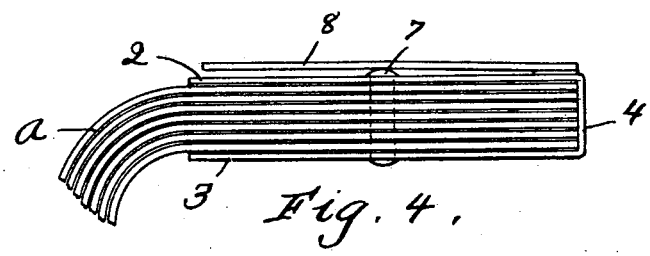
Figures 5, 6:
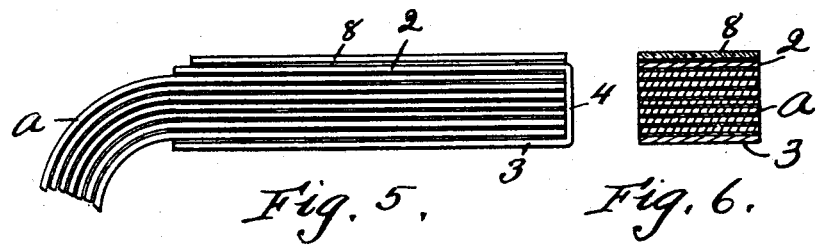

Figure 1 shows in side elevation a rail-bond embodying this invention. Fig. 2 is an enlarged detail of one end portion of the bond, showing the same in side elevation and partial section. Fig. 3 is a vertical section of the end portion of the bond shown in Fig. 2. Fig. 4 is a detail showing a modified form of sheath wherein the side portions are omitted. Fig. 5 is a detail showing a modified form of sheath shown in Fig. 4, the rivet being omitted; and Fig. 6 is a cross-section of the end portion of the bond shown in Fig. 5.

The laminated strip comprises a plurality of plates or strips $a$ of copper or other suitable material made of substantially the same length and placed one upon another. These several plates or strips are bent or formed to present a pair of flat feet and an intermediate extensible portion, herein shown as arched. The free ends or extremities of the laminated strip are dipped in melted solder for the purpose of securing them together and are then firmly held pressed together while the solder hardens. The layers comprising the intermediate portion of the laminated strip will not be connected together. The flat feet are then incased in a sheath of sheet-copper. This sheath, as shown in Figs. 1, 2, and 3, consists of a strip of copper bent or folded to comprise a top layer 2, a bottom layer 3, an end portion 4, and a pair of upturned side portions 5 6. This sheath or box-like structure is then soldered to the bond, substantially incasing each flat floot.

To insure the parts being held together under all circumstances, a rivet 7 is passed through each flat foot and through the sheath.

To complete the bond, a thick layer of sheet-solder is attached at one end to the bottom of each flat foot, which covers the head of the rivet.

Referring to Fig. 4, the sheath comprises only the top layer 2, bottom layer 3, and end portion 4, the side portions 5 and 6 being omitted; yet the sheath thus constructed is, in addition to being soldered to the flat foot, also riveted thereto by the rivet 7.

Referring to Figs. 5 and 6, the sheath shown in Fig. 4 is illustrated and the rivet omitted.

The form or construction of sheath herein shown may be easily manufactured and applied to the bond and very effectively holds the several layers composing the flat feet assembled under all conditions, and particularly prevents the ends of the thin copper strips separating, and also by inclosing the ends the introduction of any tool or instrument which may be employed by malicious persons for the purpose of ripping the bonds from the rail is prevented and a finished appearance given to the bond.

What I claim, and desire to secure by Letters Patent, is—

1. A rail-bond composed of a laminated strip having flat feet and an intermediate extensible portion, the layers composing the flat feet being soldered together, a sheath incasing each flat foot and inclosing the end thereof comprising a metallic strip bent or folded to present a top layer, a bottom layer, and an end portion, and a thick strip of sheet-solder attached at one end to said sheath, substantially as described.

2. A rail-bond composed of a laminated strip having flat feet and an intermediate extensible portion, the layers composing the flat feet being soldered together, a sheath incasing each flat foot and inclosing the end thereof comprising a metallic strip bent or folded to present a top layer, a bottom layer, an end portion, and a pair of side portions, and a thick strip of sheet-solder attached at one end to said sheath, substantially as described.

3. A rail-bond composed of a laminated strip having flat feet and an intermediate extensible portion, the layers composing the flat feet being soldered together, a sheath incasing each flat foot and inclosing the end thereof comprising a metallic strip bent or folded to present a top layer, a bottom layer, and an end portion, a rivet passing through each flat foot and through the sheath, and a thick strip of sheet-solder attached at one end to said sheath, substantially as described.

In testimony whereof I have signed my name to this specification in the presence of two subscribing witnesses.

CHARLES SPRAGUE.

Witnesses:
B. J. NOYES,
H. B. DAVIS.